Jan. 2, 1923.
M. E. MURPHY.
AUTOMOBILE BRACE.
FILED JULY 7, 1922.
1,440,837.
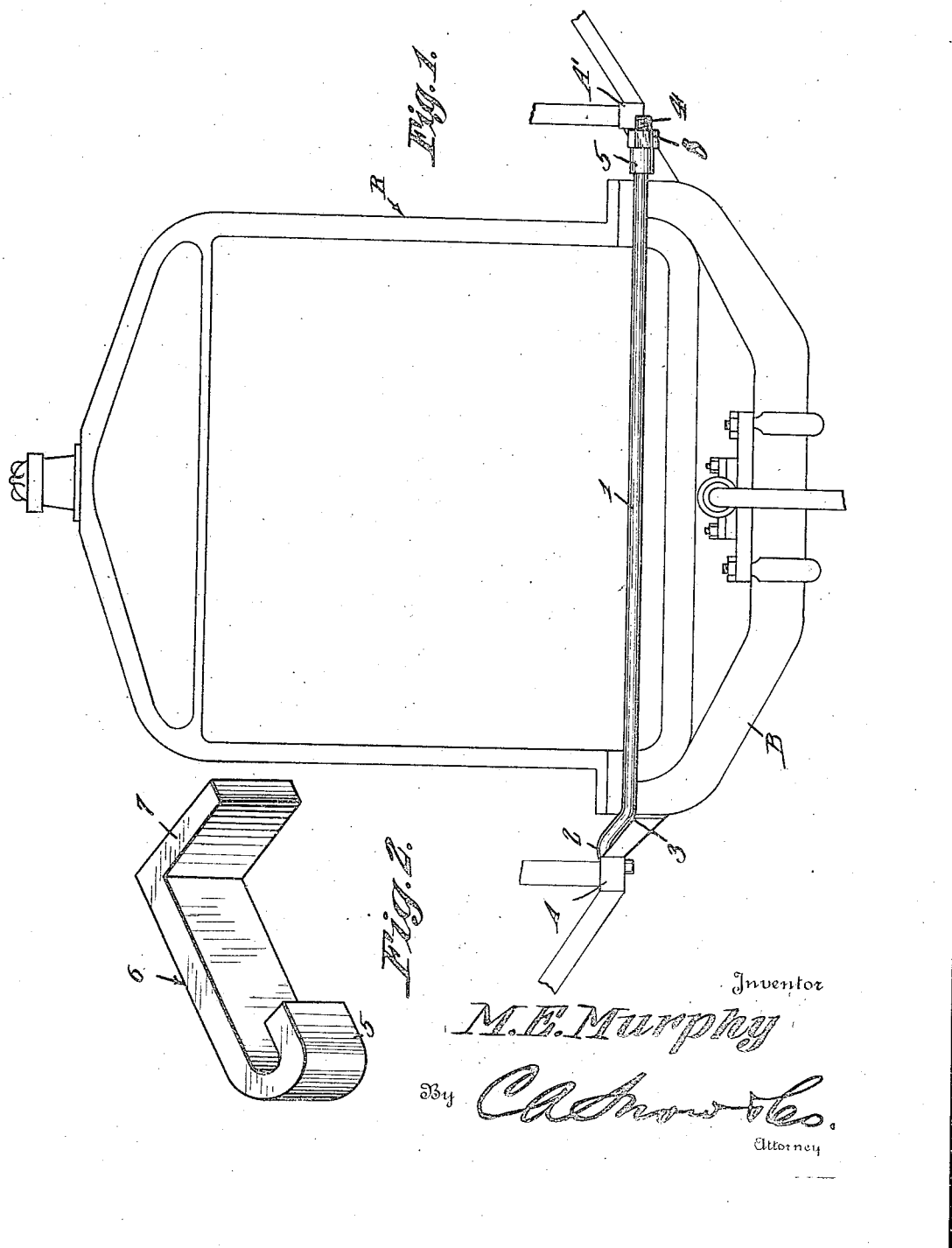

Patented Jan. 2, 1923.

1,440,837

UNITED STATES PATENT OFFICE.

MOSES E. MURPHY, OF TALMO, GEORGIA.

AUTOMOBILE BRACE.

Application filed July 7, 1922. Serial No. 573,264.

*To all whom it may concern:*

Be it known that I, MOSES E. MURPHY, a citizen of the United States, residing at Talmo, in the county of Jackson and State of Georgia, have invented a new and useful Automobile Brace, of which the following is a specification.

This invention relates to braces for automobiles, and more particularly to a cross brace for use in connection with Ford cars.

The object of the invention is to provide a cross brace for use in front of the radiator of a Ford car to prevent the breakage of the cross member of the chassis and to hold the parts of such member in place in case breakage thereof should occur thereby preventing damage to the radiator, and which also operates to retain the spring clips and fender braces tight.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a front elevation of a front portion of a Ford car with this improved brace shown applied, and Fig. 2 is a detail perspective view of the member employed for connecting one end of the brace to the car.

In the embodiment illustrated, the brace constituting this invention comprises a rod 1 of a length to extend transversely across the front of a Ford car radiator R and to project at its opposite ends beyond the sides of said radiator, being equipped at one end with a hook 2 which is designed to engage the fender arm A, a shoulder 3 being provided at the base of the hook 2 which is designed to rest against the cross bar B of the car at its junction with the radiator.

The other end of rod 1 which extends to the right of the radiator R is threaded as shown at 4 and passes through a hook 5 carried by a connector 6 which is constructed as shown in detail in Fig. 2, and is designed to be hooked behind the fender arm A'. The connecter 6 is preferably made L-shaped as shown in Fig. 2, and the short arm 7 thereof passes behind and is engaged with the fender arm A'. A nut 8 is threaded on the end 4 of the rod 1 in advance of the hook 5 and is designed to be screwed up for tightening the rod and holding the brace bar B against spreading and breakage. Should this bar B be broken in any manner, the rod 1 will retain the broken parts thereof in position and prevent breaking and spreading of the radiator. This rod 1 also operates to keep the spring clips and the fender brace tight, avoiding rattling which occurs when these parts become loose.

It will be obvious from the above description that this attachment may be constructed and sold as an article of manufacture and applied to any Ford car already in use, and when so applied will not in any way disfigure the appearance while greatly strengthening the structure.

I claim:—

1. A brace of the class described comprising a rod having a hook at one end with a shoulder at the junction of said hook and rod, the other end of the rod being threaded and having a connector detachably engaged therewith, said connector having means for adjustable connection with the fender arm of a car.

2. A brace of the class described comprising a rod having a laterally offset hook at one end for detachable engagement with the fender arm of a car, and a connector detachably engaged with the other end thereof and made in the form of an L-shaped member with a hook at one end for engagement with said rod, said rod end being threaded and provided with a nut for adjustably mounting said connector thereon.

In testimony that I claim the foregoing as my own, I have hereto affixed my signature in the presence of two witnesses.

MOSES E. MURPHY.

Witnesses:
T. C. SEABOLT,
W. C. KINNEY.